(12) United States Patent
Heift et al.

(10) Patent No.: US 11,042,764 B2
(45) Date of Patent: Jun. 22, 2021

(54) DEVICE AND A METHOD FOR DETECTING VEHICLE LIGHTS IN AN IMAGE

(71) Applicant: Aptiv Technologies Limited, St. Michael (BB)

(72) Inventors: Monika Heift, Wuppertal (DE); Klaus Friedrichs, Dortmund (DE); Andre Paus, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 85 days.

(21) Appl. No.: 16/520,825

(22) Filed: Jul. 24, 2019

(65) Prior Publication Data

US 2020/0042809 A1    Feb. 6, 2020

(30) Foreign Application Priority Data

Aug. 3, 2018    (EP) .................................... 18187237

(51) Int. Cl.
*G06K 9/00*    (2006.01)
*G06K 9/62*    (2006.01)

(52) U.S. Cl.
CPC ....... *G06K 9/00825* (2013.01); *G06K 9/6202* (2013.01); *G06K 9/6212* (2013.01)

(58) Field of Classification Search
CPC ............. G06K 9/00825; G06K 9/6212; G06K 9/6202; G06K 9/00791; G06K 9/4642;
(Continued)

(56) References Cited

U.S. PATENT DOCUMENTS

| 2004/0021853 A1 * | 2/2004 | Stam ........................ G01J 1/32 |
| | | 356/218 |
| 2005/0117027 A1 | 6/2005 | Fukuhara et al. |

(Continued)

FOREIGN PATENT DOCUMENTS

| CN | 101196663 B * | 12/2012 | ........... G09G 3/2074 |
| DE | 102016109030 A1 * | 11/2017 | ........... B60Q 11/005 |

(Continued)

OTHER PUBLICATIONS

Pribyl Bonislav et al: "Evaluation of feature point detection in high dynamic range imagery", Journal of Visual Communication and Image Representation, Academic Press, Inc., US, vol. 38, Feb. 24, 2016, pp. 141-160.
(Continued)

*Primary Examiner* — Matthew C Bella
*Assistant Examiner* — Kathleen M Broughton
(74) *Attorney, Agent, or Firm* — Colby Nipper PLLC

(57) ABSTRACT

A device for detecting vehicle lights in an image, the device is configured to receive an image captured by a camera, wherein the image comprises an array of pixels and each pixel of the image has a respective scene brightness value, compress the image to generate a compressed image, wherein the compressed image comprises an array of pixels and each pixel of the compressed image has a respective grey value, calculate for each grey value in the compressed image a corresponding scene brightness value in the image, and detect vehicle lights in the compressed image by using the calculated scene brightness values.

23 Claims, 7 Drawing Sheets

(58) Field of Classification Search
CPC .............. G06K 9/6256; G06K 9/6267; G06T 2207/10016; G06T 2207/30252; G06T 2207/20081; G06T 7/70; G06T 7/0002; G06T 5/007; G06T 5/002
See application file for complete search history.

(56) References Cited

U.S. PATENT DOCUMENTS

| | | | |
|---|---|---|---|
| 2012/0116632 A1* | 5/2012 | Bechtel | G06K 9/209 701/36 |
| 2013/0250113 A1* | 9/2013 | Bechtel | G06K 9/00798 348/148 |
| 2017/0123293 A1 | 5/2017 | Yuen et al. | |
| 2017/0359495 A1 | 12/2017 | Hawes et al. | |
| 2018/0139368 A1* | 5/2018 | Nakayama | H04N 5/232945 |

FOREIGN PATENT DOCUMENTS

| | | | | |
|---|---|---|---|---|
| EP | 1 837 803 A2 | 9/2007 | | |
| JP | 10327337 A | 12/1998 | | |
| JP | 4818609 B2 * | 11/2011 | ............ | B60Q 1/143 |

OTHER PUBLICATIONS

"Foreign Office Action", EP Application No. 1818237.5, dated Mar. 19, 2021, 6 pages.

* cited by examiner

DEVICE AND A METHOD FOR DETECTING VEHICLE LIGHTS IN AN IMAGE

CROSS-REFERENCE TO RELATED APPLICATION

This application claims the benefit under 35 U.S.C. § 119(a) of European Patent Application EP 18187237.5, filed Aug. 3, 2018, the entire disclosure of which is hereby incorporated herein by reference.

TECHNICAL FIELD OF INVENTION

The invention concerns a device and a method for detecting vehicle lights in an image.

BACKGROUND OF DISCLOSURE

Methods for vehicle light detection in camera images are usually based on traditional blob detection techniques searching for bright spots with decreasing brightness in radial direction. Another way is using supervised classification methods for structure recognition like convolutional neuronal networks, which are trained to distinguish vehicle light spots from negatives. However, if these methods are supposed to consider world brightness information or physical brightness ratios between pixels, they require fixed camera settings and fixed image preprocessing. Otherwise they respond to image structure only.

SUMMARY OF THE DISCLOSURE

Applying them on a camera image captured with automatic exposure control without taking into account the camera parameters or on an image with variable preprocessing, e.g., histogram based, strongly decreases the classifier performance.

If regarding only the bright spots itself and the immediate neighborhood, vehicle lights can be very difficult to distinguish from less bright objects, for example, reflectors, which were captured with different camera settings or brightened during the image preprocessing.

Separating them therefore requires complex features, for example, using large surroundings or motion information for a significant number of candidates.

It is an underlying object of the invention to provide a device that allows fast detection of a vehicle light in a camera image with a reduced amount of memory and image processing complexity. It is further an object of the invention to provide a system that comprises the device and a method for detecting a vehicle light in an image.

The object underlying the invention is satisfied by the features of the independent claims. Advantageous further developments and aspects of the invention are set forth in the dependent claims.

In a first aspect of the instant application a device for detecting vehicle lights in an image is provided. The device is configured to receive an image captured by a camera. The image comprises an array of pixels and each pixel of the image has a respective scene brightness value. The scene brightness value reflects the real world luminosity. The image has a certain pixel depth. For example, the image may have a depth of 12 bit. This pixel depth allows 4096 different scene brightness values or intensities, i.e., shades of gray, to be recorded. If the camera parameters, for example exposure time and/or gain, change, more different values are possible.

The device is further configured to compress the image to generate a compressed image. The compressed image comprises an array of pixels and each pixel of the compressed image has a respective grey value. The compressed image has a smaller pixel depth than the image captured by the camera. For example, the compressed image may have a depth of 8 bit, thus the compressed image may include 256 different grey values.

Before compressing the image, the image may also be preprocessed. Preprocessing may be carried out in the camera and/or in the device. In case the image has been preprocessed, the preprocessed image is compressed.

The device is further configured to calculate for each grey value in the compressed image a corresponding scene brightness value in the image and to detect vehicle lights in the compressed image by using the calculated scene brightness values.

The device provides a fast way to detect vehicle lights in a camera image using a combination of simple structure features and information about the real world luminosity, i.e., the scene brightness.

The applied camera may be operated in high dynamic range mode in combination with auto exposure control mode, and therefore able to capture highly varying lighting conditions without significant loss of image structure.

The camera may, for example, return a 12 bit image. To reduce the amount of memory and image processing complexity the image may subsequently be compressed to, for example, a tone mapped 8 bit image. This is advantageous for the subsequent calculation as one byte per pixel can efficiently be processed by the embedded central processing unit (CPU). The tone mapping was developed to sufficiently preserve the image structure for vehicle light recognition as well as other driver assistance function algorithms, e.g., lane departure warning (LDW) and forward collision warning (FCW).

However, the information about the actual brightness in world, which is an essential feature for easily distinguishing between vehicle lights and other bright spots, is lost. The nonlinear tone mapping also prevents having exact information about brightness ratios between different regions of the same image. Bright regions in night time images usually cover only a very small percentage of the image and are therefore compressed to a small grey range, despite potentially huge differences in world brightness.

To restore the scene brightness, the device provides for each grey value in the compressed image a corresponding scene brightness value in the image. Thus, the information about the actual brightness in world is not lost and this information can be used for detecting the vehicle light spots in the compressed image.

In one embodiment, the device is further configured to store the scene brightness values calculated for the grey values in the compressed image in a look-up table. In the example given above where the camera returns a 12 bit image, which is then compressed to an 8 bit image, the look-up table has 256 entries for the grey values in the compressed image and for each of the 256 grey values a respective scene brightness value is recorded in the look-up table.

The device may be configured to identify pixels in the compressed image as candidates for vehicle lights by using the look-up table.

For this purpose, the device may be configured to identify a respective pixel as a candidate for a vehicle light spot if the grey value of the pixel is higher than a grey value threshold at the same location in a local threshold image.

The local threshold image may be generated by the device performing the following steps. First, the compressed image is smoothed to generate a smoothed image. Then each grey value in the smoothed image is transformed in a scene brightness value. The scene brightness values for the grey values are provided by the look-up table. Each scene brightness value in the image is multiplied by a predetermined number, for example, the number is 4, in order to receive thresholds in scene brightness. Each scene brightness value multiplied by the predetermined number, i.e., each threshold in scene brightness, in the image is then back-transformed or back-mapped to receive grey value thresholds. The grey values for the scene brightness values are provided by the look-up table. Afterwards, each grey value threshold in the image is compared to a predetermined global minimum threshold value. If the predetermined global minimum threshold value is larger than a grey value threshold, the respective grey value threshold is replaced by the predetermined global minimum threshold value. At the end, the local threshold image is received.

In a further embodiment, the device uses a first classifier, which can be, for example, a treeboost classifier, in order to reduce the number of candidates for vehicle light spots. For each candidate for a vehicle light the device calculates one or more first features and the one or more first features are input into the first classifier. For some of the one or more first features the first classifier comprises respective thresholds. The first classifier is configured to compare each of the one or more first features of a respective candidate to the respective thresholds. From these comparisons the first classifier determines if the respective candidate should be discarded.

The first features may be selected from the following features a), b) and c):

Feature a) is a mean value of the grey values of an array of pixels around a pixel that has been identified as a candidate for a vehicle light spot. For example, the array is a 5×5 array of pixels, wherein the pixel that has been identified as a candidate for a vehicle light spot is positioned in the center of the 5×5 array. Feature a) is then the mean value of the 25 grey values of the 5×5 array.

Feature b) is a difference of mean values of grey values for arrays of pixels of different sizes with the arrays being arranged around a pixel that has been identified as a candidate for a vehicle light spot. Thus, for two arrays, which have different sizes, the mean values of the grey values are calculated and afterwards the difference of the two mean values is determined.

Feature c) is a mean value of the grey values of an array of pixels around a pixel that has been identified as a candidate for a vehicle light spot, wherein the mean value is transformed in a scene brightness value by using the look-up table.

The number of the candidates for vehicle lights may be further reduced by means of a second classifier. In this embodiment, the device calculates for each candidate for a vehicle light a second set of features and inputs the second set of features into the second classifier. The second classifier comprises thresholds for the second features. The second classifier is configured to compare each of the second features of a respective candidate to the respective thresholds and determine from these comparisons whether to discard the respective candidate. In addition, the second classifier may also use one or more of the first features as discussed above in connection with the first classifier. In this case, the second classifier comprises new thresholds for the first features which are generally different from the thresholds in the first classifier so that it can compare the first features of a respective candidate to the respective thresholds. These comparisons can contribute to the decision of the second classifier whether to discard the respective candidate or not.

The second features may be ratios of mean values of grey values for arrays of pixels of different sizes, wherein the arrays are arranged around a pixel that has been identified as a candidate for a vehicle light spot and the mean values have been transformed to scene brightness values by using the look-up table.

For the refinement of a vehicle light spot the device may be further configured to identify a pixel to belong to a candidate for a vehicle light if the respective pixel is located in the neighborhood of the candidate and the grey value of the pixel is higher than a predetermined refining threshold.

The device may compress the image to generate the compressed image by tone mapping. Tone mapping is a well-known technique used in image processing to map one set of intensities or colors to another to approximate the appearance of high-dynamic-range images in a medium that has a more limited dynamic range.

Further, the device may preprocess the image captured by the camera to generate a preprocessed image and compress the preprocessed image to generate the compressed image. In particular, the device may preprocess the image captured by the camera by linearizing the grey values of the image.

According to a second aspect of the instant application, a system comprises a camera mounted on a vehicle and configured to capture images and a device for detecting vehicle lights in an image that was captured by the camera as described above.

According to a third aspect of the instant application, a method for detecting vehicle lights in an image comprises the following steps:

receiving an image captured by a camera, wherein the image comprises an array of pixels and each pixel of the image has a respective scene brightness value;

compressing the image to generate a compressed image, wherein the compressed image comprises an array of pixels and each pixel of the compressed image has a respective grey value;

calculating for each grey value in the compressed image a corresponding scene brightness value in the image; and detecting vehicle lights in the compressed image by using the calculated scene brightness values.

The method according to the third aspect of the application may comprise the embodiments disclosed above in connection with the device according to the first aspect of the application.

BRIEF DESCRIPTION OF DRAWINGS

The invention will be described in more detail in the following in an exemplary manner with reference to an embodiment and to the drawings. There are shown in these.

DETAILED DESCRIPTION

Figure 1:
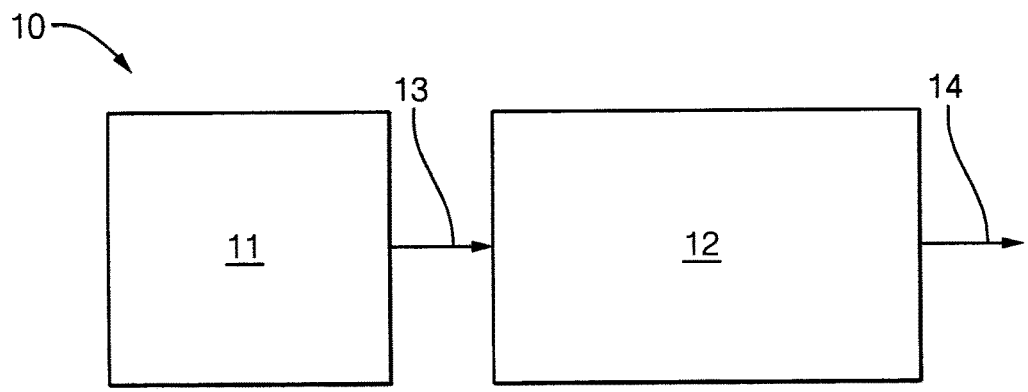
FIG. 1 is a schematic representation of an exemplary embodiment of a system for detecting vehicle lights in an image.

FIG. 1 schematically illustrates a system 10 for detecting vehicle lights in an image. The system 10 includes a camera 11 and a device 12. The system 10 is installed in a vehicle, for example, a car or a truck.

Figure 2:
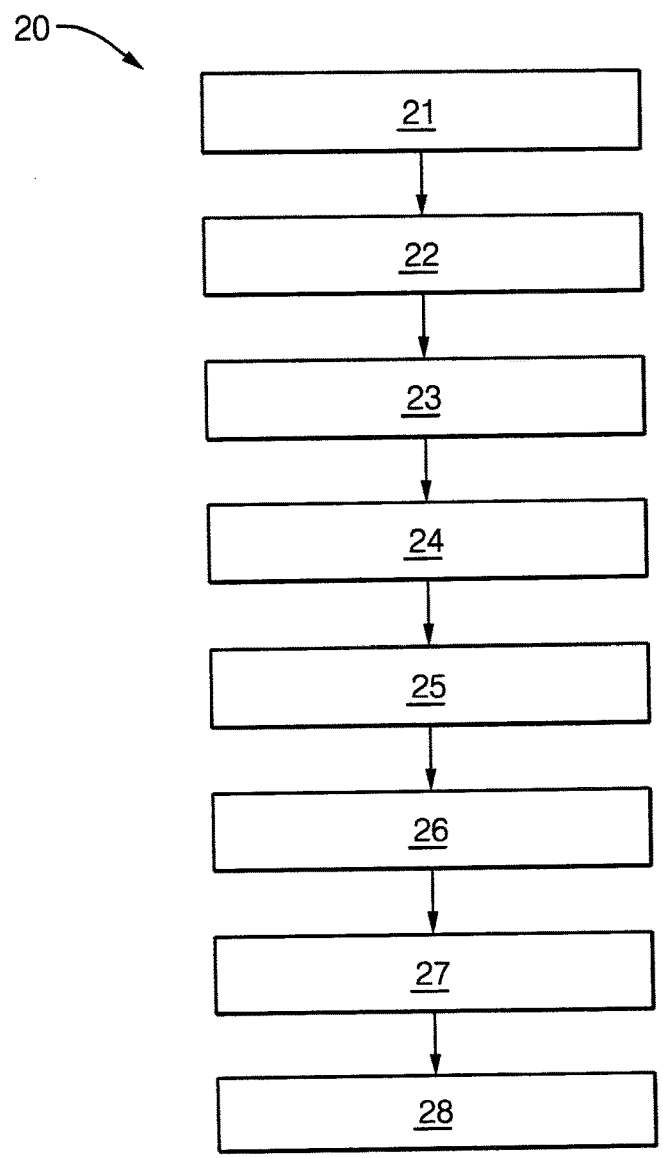
FIG. 2 is a schematic representation of an exemplary embodiment of a method for detecting vehicle lights in an image.

The camera 11 is mounted on the vehicle and captures images 13 of the area/environment in front of the vehicle. The images 13 captured by the camera 11 are fed to the device 12. The device 12 performs a method 20 for detecting vehicle lights in the image and generates an output signal 14 which contains information on vehicle lights detected in the image 13. The method 20 is schematically illustrated in FIG. 2. The device 12, the system 10 and the method 20 are exemplary embodiments according to the first, second and third aspect of the application, respectively.

Figure 3:
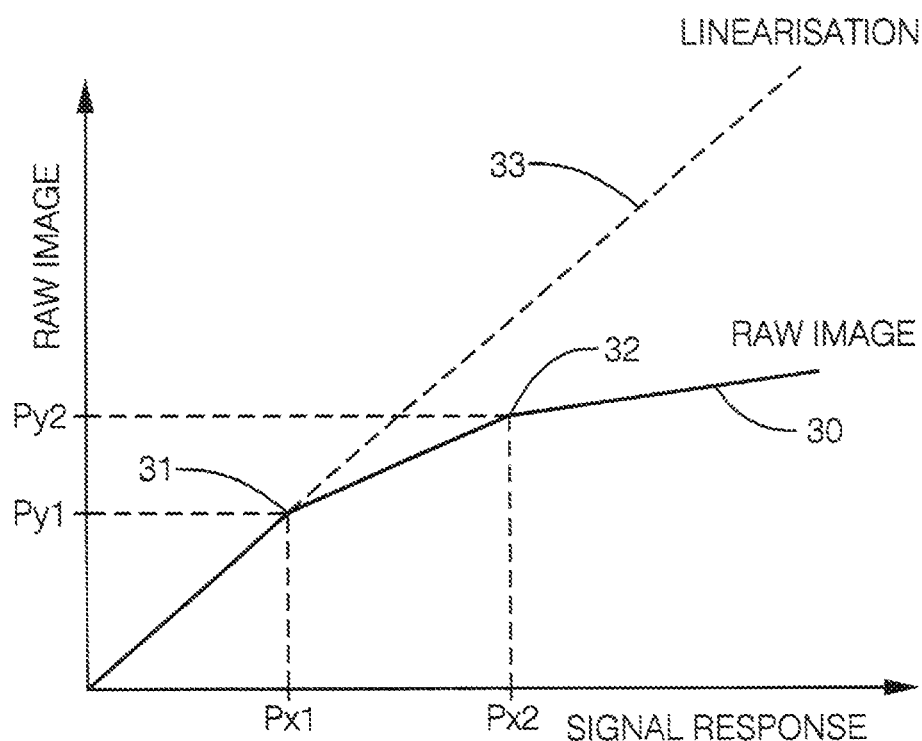
FIG. 3 is an exemplary response curve with kneepoints and an exemplary linearized curve.

In step 21 of the method 20, the camera 11 captures an image 13. The camera 11 captures images 13 in frames, in particular, video frames. In each frame the camera 11 can capture one image 13 or more than one image 13. In order to benefit from maximum possible dynamic range the image sensor of the camera 11 is driven in high dynamic range mode, which means that the image sensor sequentially captures values for three different exposure times. The response curve for the final image 13 maps the three measurement values to one piecewise linear 12 bit value with two break-points at the positions where the first two exposure times are saturated. In FIG. 3, an exemplary response curve 30 is illustrated with kneepoints 31, 32. Additionally, the auto exposure control method is used to adapt exposure time and gains to varying lighting conditions.

In step 22 of the method 20, the device 12 receives the final image 13 from the camera 11. The image 13 comprises an array of pixels and each pixel of the image 13 has a respective scene brightness value that indicates the real world luminosity. The scene brightness values may have the unit lux or a unit proportional to lux.

In step 23, the device 11 preprocesses the image 13 by carrying out the following steps: The 12 bit high dynamic range input data of the image 13 are linearized to 20 bit data, in particular, according to the data sheet of the image sensor of the camera 11. An exemplary linearized curve 33 is depicted in FIG. 3. They axis of the diagram of FIG. 3 shows the digital values for the raw image stored in 12 bit, and the x axis shows the digital values received at the image sensor output. The 20 bit data are logarithmically mapped to 12 bit data. The 12 bit image is then compressed to generate a compressed image. The compressed image comprises an array of pixels and each pixel of the compressed image has a respective grey value. The number of pixels of the compressed image may be identical to the number of pixels of the image 13 received from the camera 11. In the exemplary embodiment, compressing the 12 bit image is performed by tone mapping the image with the 12 bit data to an 8 bit image using the image histogram. Tone mapping may include that the grey values of the 12 bit data are mapped such that the grey values in the 8 bit image are evenly distributed.

The value at the output of the image sensor of the camera 11 is proportional to the following values: incident light intensity (scene brightness); the camera exposure time. The applied gain during the signal processing chain. The overall gain is the product of analog gain and conversion gain. For illustration, the following example shall be given: A scene intensity S2, which is four times higher than a scene intensity S1, can still produce the same sensor output if, for example, the exposure time of S2 is only a quarter of the exposure time of S1, or the gain of S2 is only a quarter of the gain of S1, or both exposure time and gain of S2 are half as large as for S1. Exposure time and gain are adapted to the current lighting conditions by the auto exposure control algorithm of the camera 11. They are regulated to increase the sensor output for decreasing light conditions. The camera curve defined by the two kneepoints 31, 32, and the slope of the three sections do not change during runtime. Transforming the raw data to linearized data can be, for example, performed in the following way. The domain of the raw image data (values from 0 to 4095) is transformed to 20 bit linear values using the parameters of the piecewise linear camera curve:

For $0 \leq y \leq Py1$: $y\_lin=y$

For $Py1 \leq y \leq Py2$: $y\_lin=Py1+(y-Py1)*fs1$

For $Py2 \leq y \leq 4095$: $y\_lin=Py2+(y-Py2)*fs2$

The points with the coordinates (Px1,Py1) and (Px2,Py2) are the two kneepoints 31, 32. fs1 and fs2 are the factors by which the slope changes after the two kneepoints 31, 32. The output range contains 4096 linearized 20 bit values, one for each possible point in the input range.

Transforming the linearized values to 8 bit data can be, for example, performed in the following way: The 20 bit data are mapped to 12 bit data by a logarithmic function. The output range contains 4096 12-bit scene brightness values, one for each possible point in the input range. The 12 bit values are mapped to 8 bit via tonemapping. The output range contains 4096 8-bit scene brightness values, one for each possible point in the input range.

In step 24, the device 12 calculates for each grey value in the compressed image a corresponding scene brightness value in the image 13 before compression. The information about the scene brightness is additionally stored in a look-up table. The look-up table has 256 entries for the grey values in the compressed 8 bit image and for each of the 256 grey values a respective scene brightness value is recorded in the look-up table.

The information about the scene brightness can be created in the following way: The 8 bit values of the compressed image are back transformed to the linearized 20 bit data. For example, for each possible 8 bit grey value (values from 0 to 255), we search for all occurrences of this value in the output of the previous step (linearized values to 8 bit). Then one backmapped linearized value is assigned to each grey value, which is the mean value of all corresponding linearized value (all values that have been mapped to this 8 bit value in the previous step). The output range contains 256 8-bit linearised values, one for each possible value in the 8 bit grey image.

After back transformation the values are divided by a predetermined number. The number can be the overall gain considering exposure time, analog gain, digital gain and conversion gain. Transforming the linearized values to scene brightness values may, for example, be performed as follows: The linearized values are divided by gain including analog gain, digital gain and conversion gain and exposure time to get a value directly proportional to the scene brightness. To prevent information loss, the linearized values are previously multiplied by a factor, for example 210=1024. The output range contains 256 30-bit scene brightness values, one for each possible value in the 8 bit grey image.

Figure 4:
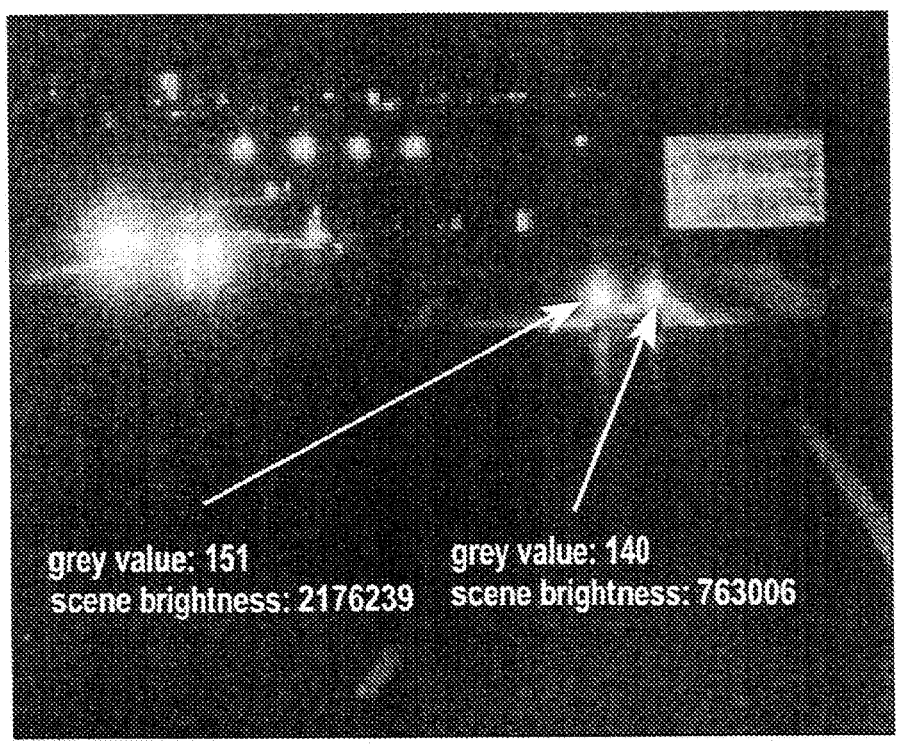
FIG. 4 is an exemplary image captured by the camera.

FIG. 4 shows an exemplary image captured by the camera 11. For two spots in the image the scene brightness values in the original image and the corresponding grey values in the compressed image are given. As can be seen from FIG. 4, the grey values, 140 and 151, are quite close, whereas the scene brightness values, 763006 and 2176239, have a huge difference. Thus, without storing the scene brightness values this information would be lost and could not be used for detecting vehicle light spots.

In step 25, a detection algorithm starts which is used to detect vehicle lights in the compressed image by using the calculated scene brightness values. Further, in step 25, the device 12 identifies and selects pixels in the compressed image as candidates for vehicle lights by using the look-up table. Candidates for vehicle lights mean that the corresponding pixels in the compressed image possibly show lights of a vehicle. Pixels are selected as candidate points if they are brighter than a local threshold in scene brightness and larger or equal to the maximum value from its 8×8 neighborhood.

Figure 5:
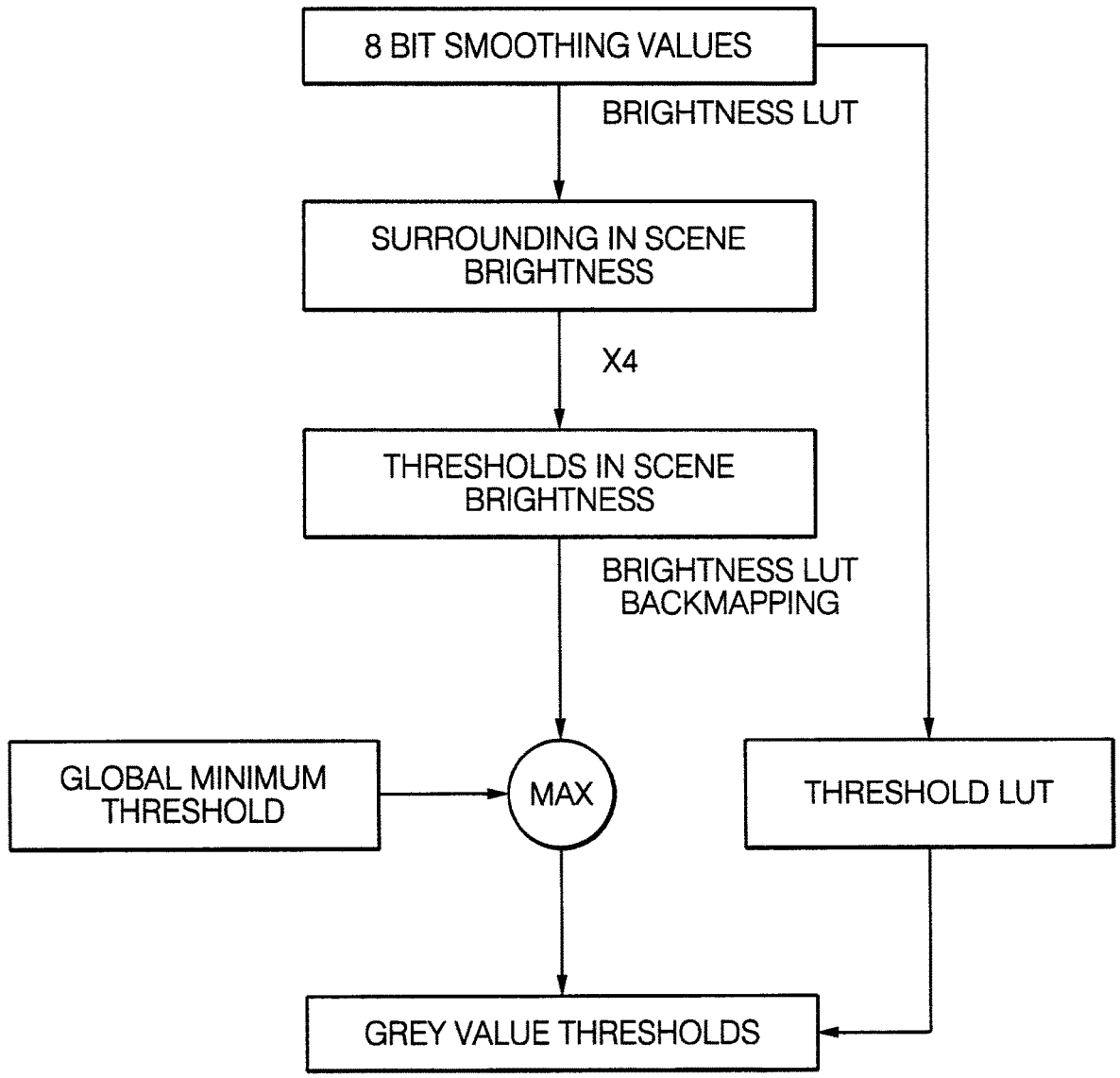
FIG. 5 is a schematic representation of the generation of a local threshold image.

The generation of the local threshold image is schematically illustrated in FIG. 5. First a smoothed version of the compressed 8 bit image is generated. The input image, i.e., the compressed 8 bit image, is smoothed and subsampled to create the smoothed image. So each pixel in the smoothed image contains a smoothed version of the local neighborhood in the compressed 8 bit image. In detail, the input image is subsampled by 2: Each pixel in the subsampled image contains the mean value of 2×2 pixels. This is repeated three times, so the resolution is divided by 8. The subsampled image is then, for example, convolved with a binominal filter [1,2,1;2,4,2;1,2,1]/16 for further smoothing. Each grey value in the smoothed image is then transformed into a scene brightness value by using the look-up table (LUT). Further, each scene brightness value in the image is multiplied by a predetermined number, which is 4 in the instant embodiment, but can also be different, in order to receive thresholds in scene brightness. Each scene brightness value in the image is then back transformed or back mapped into a grey value by using the look-up table.

Afterwards each grey value in the image is compared to a predetermined global minimum threshold value and a maximum operator is applied. Only if the predetermined global minimum threshold value is larger than a grey value, the respective grey value is replaced by the predetermined global minimum threshold value. As a result the local threshold image containing the grey value thresholds is obtained. As an alternative to do this calculation for every pixel in the smoothed image, a threshold look-up table could be used to generate the grey value thresholds from the 8 bit smoothed values. The threshold look-up table contains for each possible smoothed value a corresponding grey value threshold.

The number of expensive look-up table operations is limited to the size of the local threshold image, which is a reduction by factor 64. The threshold look-up table is pre-calculated for each frame. For the candidate point selection, the threshold comparison in followed by a non-maxima suppression. It is checked whether a candidate point is larger or equal to the maximum value from its 8×8 neighborhood.

Figure 6A:
FIG. 6A is an exemplary compressed 8 bit image.
Figure 6B:
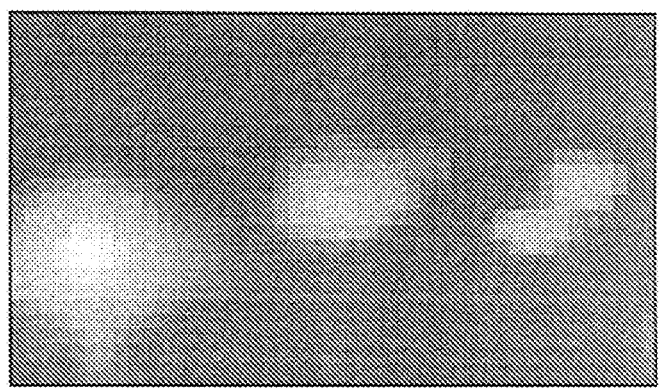
FIG. 6B is a local threshold image for the image shown in FIG. 6A.
Figure 6C:
FIG. 6C is an image showing the areas of the image of FIG. 6A that are above the local threshold.
Figure 6D:
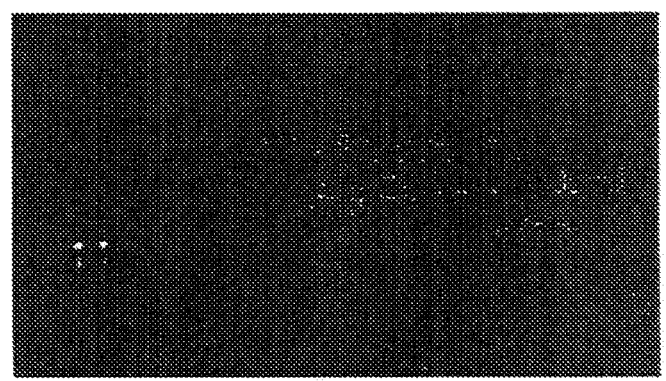
FIG. 6D is an image with a reduced number of candidate points.

FIG. 6A shows an exemplary compressed 8 bit image and FIG. 6B shows the corresponding local threshold image. A pixel in the compressed image is identified as a candidate for a vehicle light if the grey value of the respective pixel is higher than the grey value threshold at the same location in the local threshold image. FIG. 6C shows the areas of the 8 bit image of FIG. 6A, which are above the local threshold. FIG. 6D exemplarily shows an image as the result of the candidate point selection, after the non-maxima suppression.

In step 26 of the method 20, the candidate points are reduced by computationally fast features. The number of candidates can be significantly reduced by a first classifier using features based on the values of the candidate pixel itself and mean values of quadratic areas around the candidate with various sizes. A treeboost classifier can be used as the first classifier and is trained on the following first features a), b) and c): features a): calculated mean values for square sizes 1, 3, 5 and 7, features b): difference of the mean values for squares of different sizes; and features c): calculated mean values in scene brightness.

Figure 8:
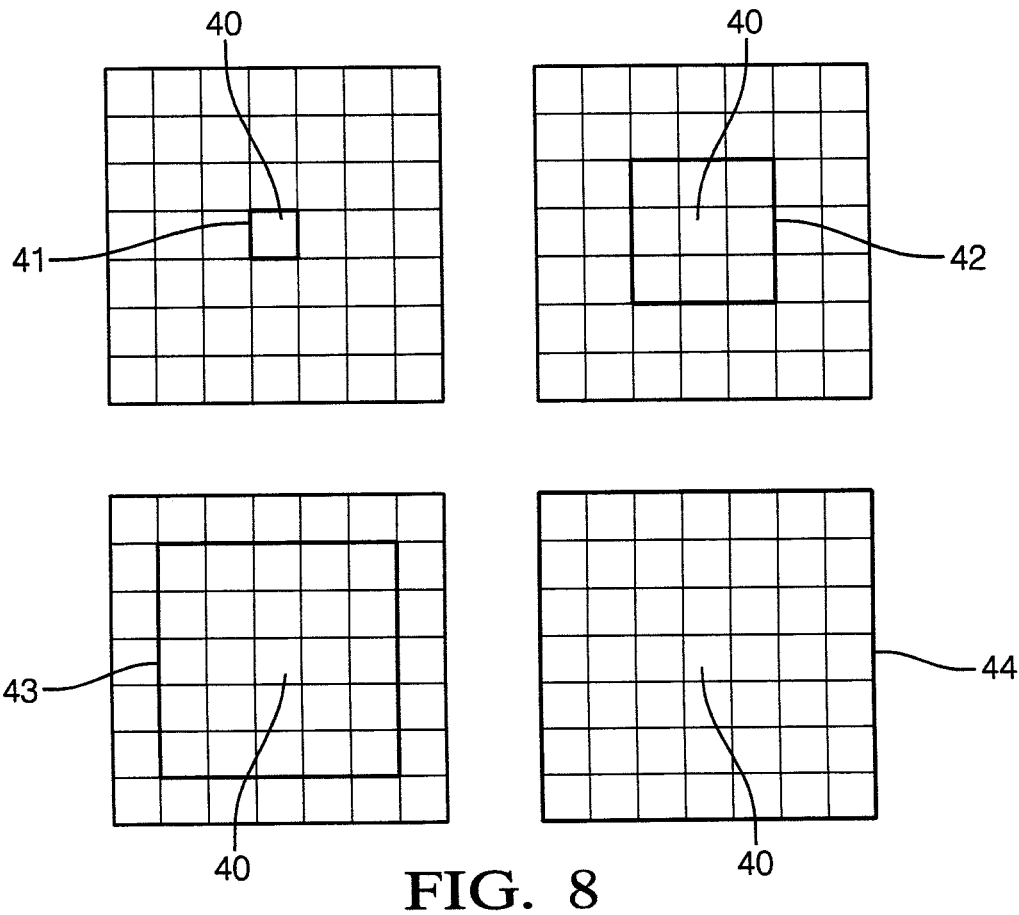
FIG. 8 is a schematic representation of pixel arrays of different sizes.

Features a) are mean values of the grey values of an array of pixels around a pixel that has been identified as a candidate for a vehicle light spot. FIG. 8 exemplarily shows a pixel 40 that has been identified as a candidate and a 1×1 array 41, a 3×3 array 42, a 5×5 array 43 and a 7×7 array 44 around the pixel 40, wherein the pixel is positioned in the center of each of the arrays 41 to 44. Features a) are the mean value of the grey values of the pixels of one of the arrays 41 to 44.

Features b) are the difference of mean values of grey values for arrays of pixels of different sizes with the arrays being arranged around a pixel that has been identified as a candidate for a vehicle light spot. Thus, for two arrays, which have different sizes, the mean values of the grey values are calculated and afterwards the difference of the two mean values is determined. The two arrays can be, for example, two of the arrays 41 to 44.

Features c) are the mean values of the grey values of an array of pixels around a pixel that has been identified as a candidate for a vehicle light spot, for example, one of the arrays 41 to 44. The mean values are transformed in a scene brightness value by using the look-up table.

For each candidate for a vehicle light the first features a), b) and c) are calculated and input into the treeboost classifier. For some of the first features a), b) and c) the treeboost classifier comprises respective thresholds. The treeboost classifier compares each of the first features a), b) and c) of a respective candidate to the respective thresholds. From these comparisons the treeboost classifier determines if the respective candidate should be discarded.

Figure 7:
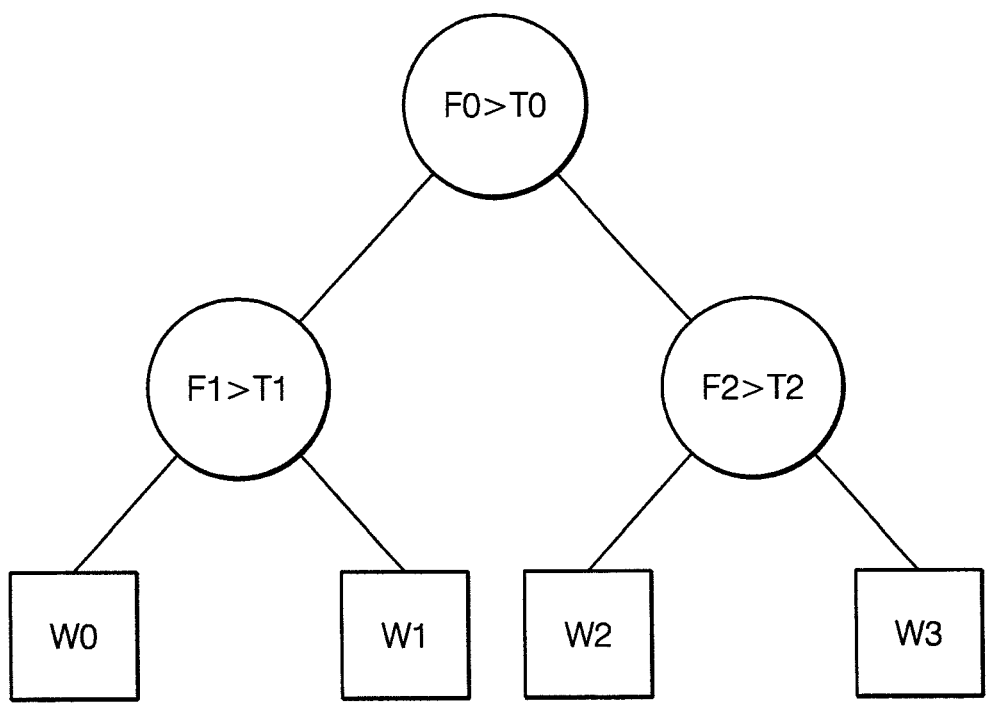
FIG. 7 is an example of a treeboost classifier.

An example of a treeboost classifier is illustrated in FIG. 7. The treeboost classifier works in the following way: It contains a number of decision trees, for example 20, each containing a number of nodes, for example 3. FIG. 7 shows an example for a decision tree with 3 nodes.

The output of the decision tree shown in FIG. 7 is one of weights W0, W1 and W2 or W3 shown in FIG. 7. At each of the three nodes one of features F0, F1 and F2 is compared to a respective threshold T0, T1 and T2. The thresholds T0, T1 and T2 are generated during a training mode when images with known features are presented to the treeboost classifier.

The output of the decision tree is as follows:

W0 if feature F0>threshold T0 and feature F1>threshold T1

W1 if feature F0>threshold T0 and feature F1≤threshold T1

W2 if feature F0≤threshold T0 and feature F2>threshold T2

W3 if feature F0≤threshold T0 and feature F2≤threshold T2

The features F0, F1 and F2 can be all the same feature or different features from the set of the first features a), b), c), dependent on the training process. The treeboost classifier confidence is the sum of the weights for all contained decision trees, for example 20. A higher confidence means that the probability for the candidate being a bright spot is higher. The candidate is discarded or rejected if the confidence is below a threshold trained during the detector training process. The treeboost for the first cascade is trained on all the first features, even though it is possible that not all features are selected during runtime.

Once the treeboost thresholds have been trained, the look-up operation can be avoided by alternatively transforming the treeboost thresholds for the scene brightness features from scene brightness to 8 bit values. This is more expensive as a search algorithm is required to find the position of the threshold values in the look-up table. However, it only needs to be done once per image frame for only few thresholds. The computational effort is in most cases negligible against doing the look-up operation for all candidates. Furthermore, it is independent from the number of candidates, and thus improving the real time computation properties.

In step 27 of the method 20, the number of candidates for vehicle lights is further reduced by using a second classifier, which can be a treeboost classifier. The second classifier is trained on second features. In addition, the second classifier can also be trained on one or more of the first features as discussed above in connection with the first classifier. The second features are ratios of mean values of grey values for arrays of pixels of different sizes with the arrays being arranged around a pixel that has been identified as a candidate for a vehicle light, wherein the mean values are transformed to scene brightness values by using the look-up table. The ratios between image mean values in scene brightness were found to be the most valuable features, but too expensive for the previous steps, as transformations to scene brightness via the look-up table as well as the division cannot be avoided.

During runtime, the device 12 calculates for each candidate for a vehicle light the second features and the second classifier compares the second features to the thresholds generated during the training period. The second classifier can contain decision trees as discussed above. Features from the first cascade, i.e. the first classifier, can be selected again for the decision trees of the second classifier.

Figure 9:
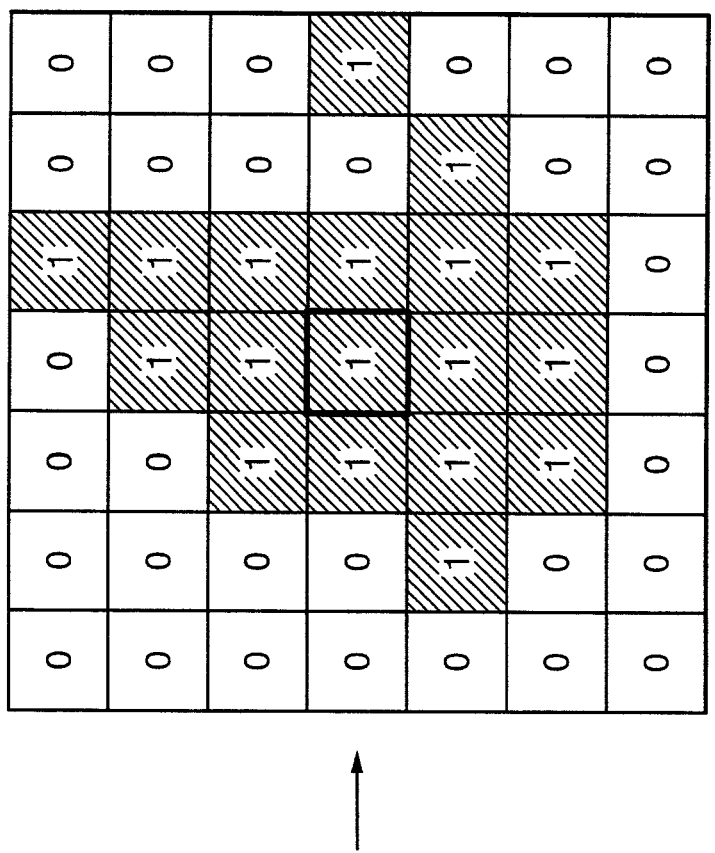
FIG. 9 is an example of a spot refinement.

Furthermore, scene brightness information is used for spot refinement. Pixels are considered to belong to the bright spot, if they are higher than the refining threshold and connected to the candidate point, i.e., located in the neighborhood of the candidate. It is sufficient if the connection to the candidate point is indirect, if the pixels on some way between the respective pixel and the candidate point are also above the threshold. This is exemplarily illustrated in FIG. 9. The threshold here is 235. On the left hand side of FIG. 9 a 7×7 image patch around the candidate spot with the values 255 is shown. On the right hand side of FIG. 9 all pixels which are considered to belong to the bright spot are labeled as 1. All other pixels are labeled as 0. The area around a pixel that belongs to the neighborhood of the pixel can also be predetermined.

The refining threshold corresponds to the geometric mean in scene brightness between the candidate point and the value from the smoothed image representing the local neighborhood, which was already used in step 25. For runtime reasons, the clustering can be limited to an array of 7×7 pixels around the candidate point.

Figure 10:
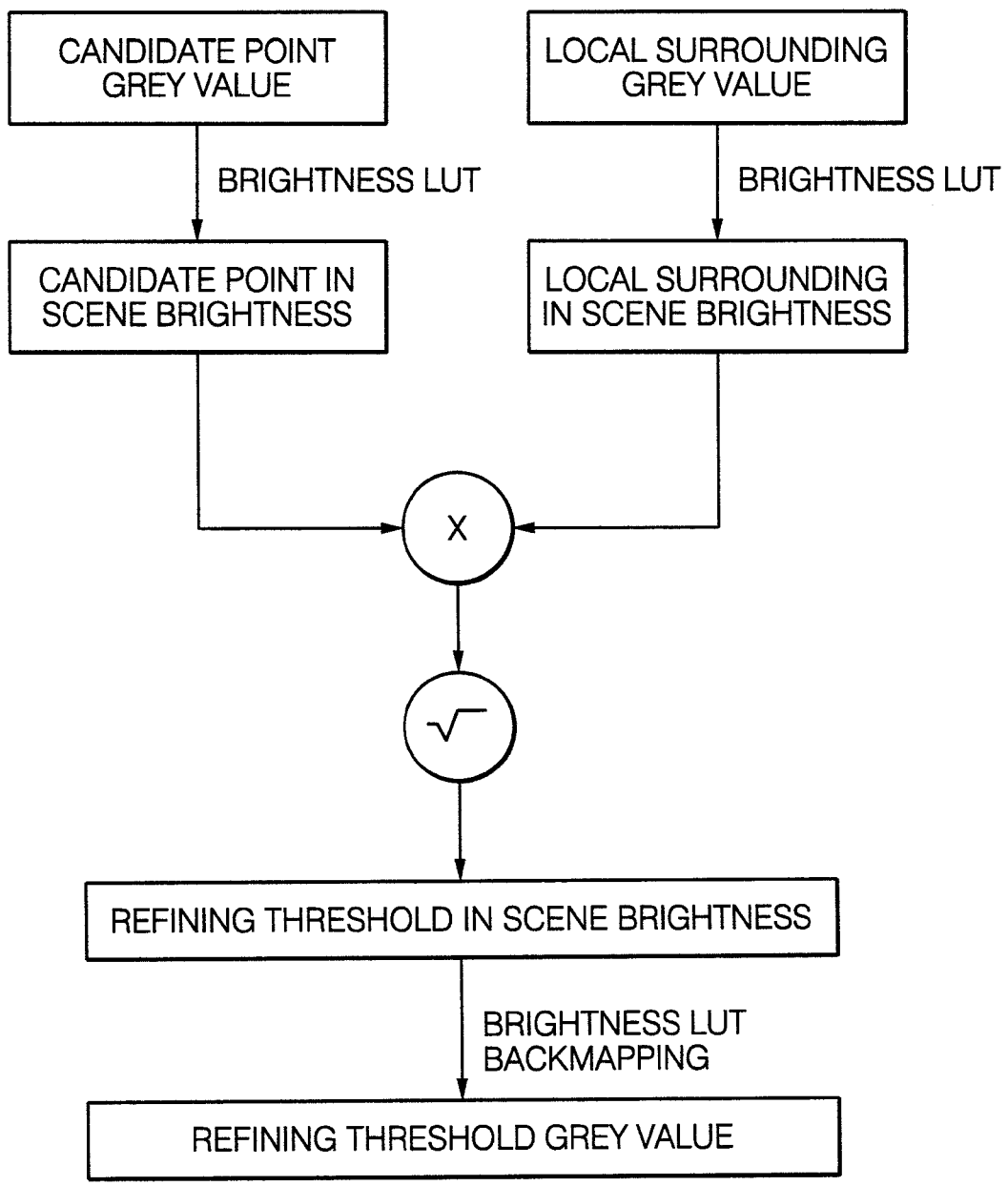
FIG. 10 is a schematic representation of the generation of a refining threshold.

The generation of the refining threshold is schematically illustrated in FIG. 10. The candidate point grey value and the local surrounding grey value are transformed by means of the look-up table to corresponding values in scene brightness. These values are multiplied and the square root is calculated to obtain the refining threshold in scene brightness, which is then back mapped to the refining threshold grey value using the look-up table. To find larger spots, the algorithm is additionally processed on images with lower resolution. Due to the refining step, it is sufficient to reduce the resolution in each dimension by two for each step instead of having one resolution for each possible spot size.

In step 28 of the method 20, additional steps can be carried out to detect vehicle lights in the compressed image. In summary, the bright spot detection method presented herein uses scene brightness information on three different sub-steps: for calculating a local threshold for candidate point selection; for feature calculation, wherein valuable scene brightness features were found to be mean image values of areas around the candidate points transformed to scene brightness; and ratios in scene brightness between areas of different sizes around the candidate point, and for calculating a local threshold for the subsequent spot refinement.

Using a look-up operation to get the scene brightness is, however, also quite expensive. The first two steps of the detector therefore avoid transformations for each candidate point by alternatively applying transformed thresholds. The thresholds need to be calculated only once for each video frame. This takes much less amount of computation time, since it is independent from the variable number of processed candidate points. Only the additional refining step and further brightness feature calculation requires transforming values related to specific bright spot candidates to scene brightness.

The steps 25 and 26 are capable of rejecting the majority of candidates. Only a significantly reduced number of remaining candidates is passed on to step 27, consequently it is allowed to be more expensive.

LIST OF REFERENCE SIGNS 10 system
11 camera
12 device
13 image
14 output signal
20 method
30 response curve
31 kneepoint
32 kneepoint
33 linearized curve
40 pixel
41 1×1 array
42 3×3 array
43 5×5 array
44 7×7 array

We claim:
1. A device for detecting vehicle lights in an image, the device is configured to:

receive the image captured by a camera, wherein the image comprises an array of pixels and each pixel of the image has a respective scene brightness value;

compress the image to generate a compressed image, wherein the compressed image comprises an array of pixels and each pixel of the compressed image has a respective grey value, the compressed image having a smaller pixel depth than the image captured by the camera;

calculate for each grey value in the compressed image a corresponding scene brightness value in the image, the scene brightness values calculated for the grey values in the compressed image being stored in a look-up table;

identify pixels in the compressed image as candidates for vehicle lights by using the look-up table; and detect the vehicle lights in the compressed image by using the scene brightness values stored in the look-up table.

2. The device as claimed in claim 1, wherein:
the compressed image is an 8-bit image with 256 potential grey values; and
the look-up table comprises a respective scene brightness value for each of the 256 potential grey values in the compressed image.

3. The device as claimed in claim 1, wherein the compressed image does not include scene brightness values.

4. The device as claimed in claim 1, the device is further configured to:
smooth the compressed image to generate a smoothed image;
transform each grey value in the smoothed image in the scene brightness value by using the look-up table;
multiply each scene brightness value by a predetermined number to receive thresholds in scene brightness;
back-transform each scene brightness value multiplied by the predetermined number in the grey value by using the look-up table to receive grey value thresholds;
compare each grey value threshold to a predetermined global minimum threshold value and replacing a respective grey value threshold by a predetermined global minimum threshold value if the predetermined global minimum threshold value is larger than the respective grey value threshold to generate a local threshold image; and
identify a respective pixel as a candidate for the vehicle lights if the grey value of the respective pixel is higher than the grey value threshold for a pixel at a same location in the local threshold image.

5. The device as claimed in claim 1, wherein the device is further configured to:
calculate for each candidate for vehicle lights one or more first features and using a first treeboost classifier as respective thresholds for the one or more first features;
compare each of the one or more first features of a respective candidate for vehicle lights to the respective thresholds; and
reduce a number of candidates for vehicle lights by using the first treeboost classifier to determine from the comparisons whether to discard the respective candidate for vehicle lights.

6. The device as claimed in claim 5, wherein the one or more first features are one or more of the following features a), b), or c):
a) mean values of the grey values of an array of pixels around a pixel that has been identified as a candidate for vehicle lights;
b) differences of mean values of grey values for arrays of pixels of different sizes with the arrays being arranged around a pixel that has been identified as a candidate for vehicle lights; or
c) mean values of the grey values of an array of pixels around a pixel that has been identified as a candidate for vehicle lights with the mean value being transformed in the scene brightness value by using the look-up table.

7. The device as claimed in claim 5, wherein the device is further configured to:
calculate, for each candidate for vehicle lights, second features using a second classifier as thresholds for the second features;
compare the second features of a respective candidate for vehicle lights to the respective thresholds; and
further reduce the number of candidates for vehicle lights by using the second classifier to determine from the comparison whether to discard the respective candidate for vehicle lights.

8. The device as claimed in claim 7, wherein the second features are ratios of mean values of grey values for arrays of pixels of different sizes with the arrays being arranged around a pixel that has been identified as a candidate for vehicle lights and the mean values being transformed to scene brightness values by using the look-up table.

9. The device as claimed in claim 1, wherein the device is further configured to identify a pixel to belong to a candidate for vehicle lights if the respective pixel is located near the candidate for vehicle lights and the grey value of the pixel is higher than a predetermined refining threshold.

10. The device as claimed in claim 1, wherein the device is further configured to compress the image by tone mapping to generate the compressed image.

11. The device as claimed in claim 1, wherein the device is further configured to preprocess the image captured by the camera to generate a preprocessed image and to compress the preprocessed image to generate the compressed image.

12. A system, comprising
the camera mounted on a vehicle and configured to capture images, and
the device for detecting vehicle lights in an image as claimed in claim 1.

13. A method for detecting vehicle lights in an image, the method comprising:
receiving, with a device, the image captured by a camera, wherein the image comprises an array of pixels and each pixel of the image has a respective scene brightness value;
compressing the image, with the device, to generate a compressed image, wherein the compressed image comprises an array of pixels and each pixel of the compressed image has a respective grey value, the compressed image having a smaller pixel depth than the image captured by the camera;
calculating, with the device, for each grey value in the compressed image a corresponding scene brightness value in the image, the scene brightness values calculated for the grey values in the compressed image being stored in a look-up table;
identifying pixels in the compressed image as candidates for vehicle lights by using the look-up table; and
detecting, with the device, the vehicle lights in the compressed image by using the scene brightness values stored in the look-up table.

14. The method as claimed in claim 13, wherein:
the compressed image is an 8-bit image with 256 potential grey values; and the look-up table comprises a respective scene brightness value for each of the 256 potential grey values in the compressed image.

15. The method as claimed in claim 13, wherein the compressed image does not include scene brightness values.

16. The method as claimed in claim 13, the method further comprising:
identifying a respective pixel as a candidate for vehicle lights if the grey value of the pixel is higher than a grey value threshold for a pixel at a same location in a local threshold image; and
generating the local threshold image by:
smoothing the compressed image to generate a smoothed image;
transforming each grey value in the smoothed image in the scene brightness value by using the look-up table;
multiplying each scene brightness value by a predetermined number to receive thresholds in scene brightness;
back-transforming each scene brightness value multiplied by the predetermined number in the grey value by using the look-up table to receive grey value thresholds; and
comparing each grey value threshold to a predetermined global minimum threshold value and replacing a respective grey value threshold by a predetermined global minimum threshold value if the predetermined global minimum threshold value is larger than the respective grey value threshold.

17. The method as claimed in claim 13, the method further comprising reducing the number of candidates for vehicle lights by using a first treeboost classifier by:
calculating for each candidate for vehicle lights one or more first features, the first treeboost classifier comprising respective thresholds for the one or more first features;
comparing each of the one or more first features of a respective candidate for vehicle lights to the respective thresholds; and
determining from the comparisons whether to discard the respective candidate for vehicle lights.

18. The method as claimed in claim 17, wherein the one or more first features are one or more of the following features a), b), or c):

a) mean values of the grey values of an array of pixels around a pixel that has been identified as a candidate for vehicle lights;

b) differences of mean values of grey values for arrays of pixels of different sizes with the arrays being arranged around a pixel that has been identified as a candidate for vehicle lights; or c) mean values of the grey values of an array of pixels around a pixel that has been identified as a candidate for vehicle lights with the mean value being transformed in the scene brightness value by using the look-up table.

19. The method as claimed in claim 17, the method further comprising reducing the number of candidates for vehicle lights by using a second classifier by:
calculating, for each candidate for vehicle lights, second features, the second classifier comprising thresholds for the second features;
comparing the second features of a respective candidate for vehicle lights to the respective thresholds; and
determining from the comparison whether to discard the respective candidate for vehicle lights.

20. The method as claimed in claim 19, wherein the second features are ratios of mean values of grey values for arrays of pixels of different sizes with the arrays being arranged around a pixel that has been identified as a candidate for vehicle lights and the mean values being transformed to scene brightness values by using the look-up table.

21. The method as claimed in claim 13, wherein the method further comprises identifying a pixel to belong to a candidate for vehicle lights if the respective pixel is located near the candidate for vehicle lights and the grey value of the pixel is higher than a predetermined refining threshold.

22. The method as claimed in claim 13, wherein the method further comprises compressing the image by tone mapping to generate the compressed image.

23. The method as claimed in claim 13, wherein the method further comprises preprocessing the image captured by the camera to generate a preprocessed image and compressing the preprocessed image to generate the compressed image.

* * * * *